Dec. 23, 1958

J. P. JONES, JR 2,866,017

STABILIZED SIGNAL TRANSLATING CIRCUITS

Filed April 18, 1956

INVENTOR.
JOHN PAUL JONES, JR

United States Patent Office 2,866,017

Patented Dec. 23, 1958

2,866,017

STABILIZED SIGNAL TRANSLATING CIRCUITS

John Paul Jones, Jr., Pottstown, Pa., assignor to Navigation Computer Corporation, a corporation of Pennsylvania Application April 18, 1956, Serial No. 579,086

6 Claims. (Cl. 179—171)

This invention relates in general to semi-conductor signal translating circuits and in particular to circuit means for stabilizing the operation of such circuits with temperature variation.

Semi-conductor signal translating devices, of which the transistor is an example, are temperature sensitive. For this reason, variation in the ambient temperature will cause an undesired variation in the electrical characteristics of transistors, leading to unistable and hence undesirable circuit operation. Attempts to stabilize the circuit operation of transistors with changes in temperature have been partially successful. As an example of one approach to this problem, temperature sensitive impedance elements, of which thermistors are an example, have been used in association with transistors in an attempt to compensate for the variable transistor characteristics with changes in temperature. One difficulty encountered with this type stabilization is that the variable impedance or resistance of the thermistor does not accurately correspond with the impedance changes required to completely stabilize the transistor.

It is accordingly an object of this invention to provide improved circuit means for stabilizing the circuit operation of transistors with variation in temperature.

It is another object of this invention to provide improved means, including a temperature responsive impedance element, to accurately compensate for variation in the operating characteristics of a transistor signal translating device with changes in ambient temperature.

It is yet another object of the present invention to provide relatively simple and improved circuit means for permitting effective stabilization of a transistor signal translating circuit by means of a temperature responsive impedance element such as a thermistor.

The present invention is particularly adapted for use in a transistor signal translating circuit of the common emitter type in which an input signal is applied to the base electrode and an output signal is derived from the collector electrode, the emitter electrode being common to the input and output circuits. In accordance with the invention, a tolerable amount of degenerative resistance is connected with the emitter depending on the circuit requirements, and a temperature sensitive impedance element is connected between the base and an intermediate point of the emitter resistance. By proper selection of this intermediate connection it has been found, in accordance with the invention, that highly stabilized circuit operation may be achieved.

Figure 1:
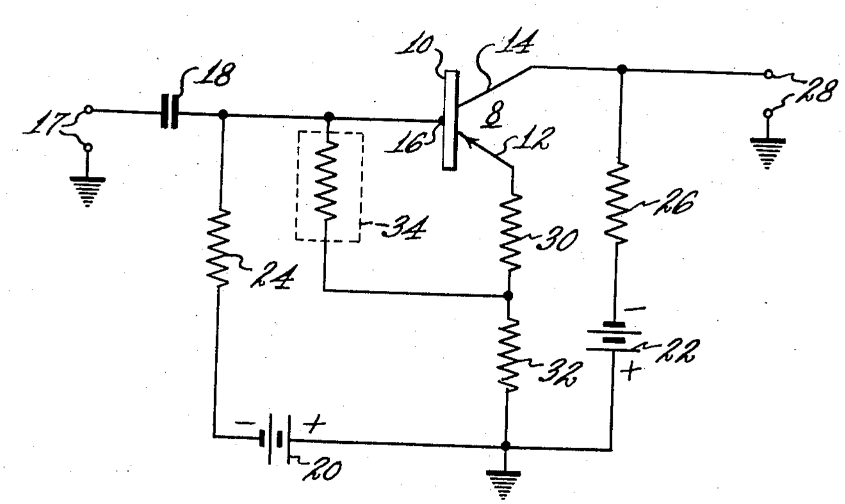
Figure 2:
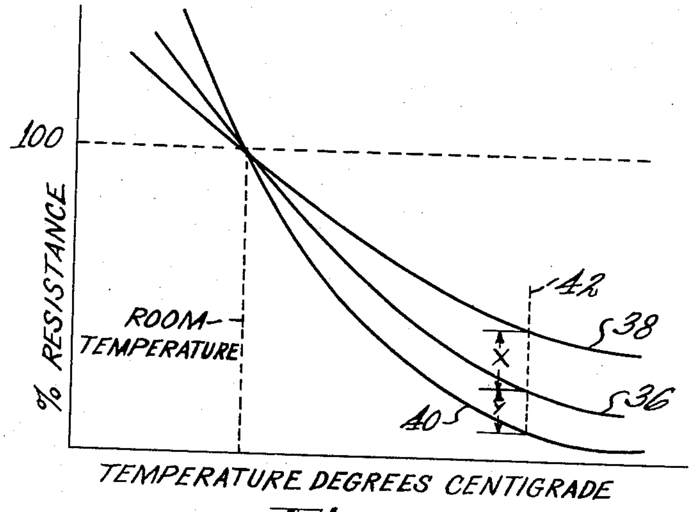

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing, in which:

Figure 1 is a schematic circuit diagram of a stabilized transistor signal translating circuit embodying the invention; and Figure 2 is a graph illustrating resistance ratio temperature characteristics of a circuit of the type illustrated in Figure 1.

Referring now to the drawing and particularly to Figure 1 thereof, a signal translating circuit includes a transistor 8, which for purposes of illustration may be considered to be of the P–N–P junction type. It should be understood, however, that transistors of P type conductivity, for example an N–P–N junction transistor, could be used providing the polarity of the biasing potentials is reversed, and that the invention is not restricted to transistors of the junction type. The transistor 8 includes a semi-conductive body 10 and three electrodes which are designated as emitter 12, a collector 14, and a base 16.

Input signals are applied to the circuit at a pair of input terminals 17, one of which is grounded as shown. The ungrounded input terminal is connected through a coupling capacitor 18 to the base 16 of the transistor 8. To provide proper biasing potentials for amplifying operation of the transistor 8, a pair of batteries 20 and 22 are provided, each of which has its positive terminal connected to a common junction point or point of reference potential in the circuit, illustrated as ground. The negative terminal of the battery 20 is connected through a resistor 24 to the base 16. The negative terminal of the battery 22, on the other hand, is connected through an output load resistor 26 to the collector 14 of the transistor 8. To derive an amplified output signal from the circuit, a pair of output terminals 28 are provided, one of which is grounded as shown. The other or ungrounded output terminal is connected directly with the collector 14 of the transistor 8.

To provide highly stabilized circuit operation, in accordance with the invention, a degenerative impedance is connected between the emitter and the circuit junction point or ground. In the present example, this degenerative impedance has been illustrated as a pair of resistors 30 and 32 which are connected between the emitter 12 and ground. The circuit is completed, in accordance with the invention, by connecting an impedance element 34, having a negative temperature coefficient of resistance, between the base 16 and a point intermediate the degenerative emitter resistors 30 and 32. The impedance element 34, of which the thermistor is an example, has a characteristic such that its resistance decreases with increasing temperature.

In practicing the invention, the total emitter impedance is first selected in accordance with the circuit requirements and specifications. That is to say, the total resistance value of the resistors 30 and 32 is chosen irrespective of the temperature specifications and according to the gain requirements of the circuit. The temperature responsive impedance element or thermistor 34 is then connected between the base 16 and, in accordance with the invention, a predetermined intermediate point of the emitter impedance or resistance, illustrated in the present example as the junction of the resistors 30 and 32.

The manner in which this intermediate connection point is determined, may be appreciated from a consideration of the graph of Figure 2, wherein the resistance ratio temperature characteristics for a circuit of the type illustrated in Figure 1 are illustrated. In this graph, the ratio of the actual circuit resistance at a given temperature to the resistance at room temperature (25° C.) is plotted against ambient temperature. The curve 36 illustrates the resistance ratio temperature characteristic of a typical, commercially available thermistor, such as the thermistor 34 in Figure 1. The curve 38, on the other hand, illustrates the derived values of resistance which are necessary to stabilize the circuit operation of the transistor by the connection of a variable resistance between the base 16 and circuit ground. This curve may be determined experimentally by connecting a variable resistor between the base and ground and varying the ambient temperature. The resistance values necessary to maintain a preselected output signal level for a constant input signal with variation in temperature are then recorded and plotted as in the curve 38. The curve 40 is an experimental curve of the required resistance values necessary for stable operation with a resistor connected directly between the base and the emitter with the total preselected resistance, the total resistance of the resistors 30 and 32 in Figure 1, for example, connected between the emitter and ground. The curve 40 may be determined by connecting a variable resistor between the base and emitter and recording the resistance values necessary to maintain a constant output current as the temperature is varied.

From a consideration of the graph of Figure 2, it is seen that the thermistor characteristic curve 36 is intermediate the curves 38 and 40, representing the variable resistance characteristics necessary to stabilize the circuit operation with a variable resistance connected between the base and ground and the base and the emitter, respectively. It is the discovery of this relation, in accordance with the invention, which permits complete and effective circuit stabilization with a standard thermistor. As noted above, the total permissible emitter circuit resistance is first selected. This selection is based on the circuit requirements such as gain. The curves 38 and 40 are then experimentally plotted using a variable resistance device and compared to the known characteristics of the available thermistor. A ratio is then determined at some convenient point on the curve, for example, at the point represented by the dotted line 42. The ratio determined by $X/Y$, for example, is then determined, X being the distance of the curve 38 from the curve 36 along the ordinate and Y being the distance of the curve 40 from the curve 36 along the ordinate. If, for example, the distance between the curve 38 and the curve 36 at a given point is twice the distance between the curve 40 and the curve 36, the ratio of the resistance of the resistor 30 to the resistance of the resistor 32 will be chosen to be 2 to 1. Thus, for example, if the total emitter resistance is originally chosen to be 75 ohms, the resistor 30 will be chosen to be 50 ohms, while the resistance of the resistor 32 will be 25 ohms.

Under normal conditions, the collector or output current of the transistor will increase as the ambient temperature increases due to the thermal generation of minority carriers or holes. The circuit embodying the invention compensates for this increase in output current by by-passing a portion of the input current to ground through the direct-current path which includes the thermistor 34 and the resistor 32. As the temperature increases, the resistance of this path will decrease due to the negative temperature coefficient of the thermistor 34. Accordingly, more input current will be by-passed as the temperature is increased. The effective gain of the circuit, therefore, remains constant irrespective of temperature variation and a substantially constant output current is maintained. Under ordinary circumstances, the thermistor compensations would not be precise since the characteristics of commercially available thermistors are not the same as the temperature characteristics of the transistor. By connecting the thermistor to an intermediate point of an emitter resistance, however, in accordance with the teachings of this invention, precise temperature compensation is easily achieved. By provision of the present invention, therefore, operating point stabilization of a transistor is achieved with relatively simple circuit connections and by the use of a single temperature sensitive impedance element.

What is claimed is:

1. Stabilizing circuit means for a signal translating circuit including a transistor having base, emitter, and collector electrodes; signal input means connected for applying an input signal between said base electrode and a common point in said circuit; and signal output means connected for deriving an output signal between said collector electrode and said common point; comprising impedance means connected in series between said emitter electrode and said common point, and a passive temperature responsive impedance element having a negative temperature coefficient direct-current conductively and directly connected between said base electrode and an intermediate point of said impedance means, said intermediate point being selected to provide a substantially constant output current from said transistor with variation in temperature.

2. A stabilized signal translating circuit comprising, in combination, a transistor having base, emitter, and collector electrodes, input means connected in said circuit for applying an input signal between said base electrode and a common point in said circuit, output means connected in said circuit for deriving an output signal between said collector electrode and said common point, stabilizing means including a passive temperature responsive resistance element having a negative temperature coefficient direct-current conductively and directly connected at one end to said base electrode, a pair of resistors connected in series between said emitter electrode and said common point, and means direct-current conductively and directly connecting the other end of said temperature responsive resistance element to the junction of said resistors, the resistance of said resistors being selected to provide a substantially constant output current from said transistor with variation in ambient temperature.

3. In a signal amplifier circuit, the combination comprising, a transistor having base, emitter, and collector electrodes, input circuit means connected for applying an input signal between said base electrode and a common point in said circuit, output circuit means connected for deriving an output signal between said collector electrode and said common point, a pair of resistors connected in series between said emitter electrode and said common point, and a thermistor direct-current conductively and directly connected between said base electrode and the junction of said resistors, the resistance of said resistors being selected relative to the characteristics of said thermistor to provide a substantially constant collector output current from said transistor despite variation in ambient temperature.

4. A stabilized signal translating circuit comprising, in combination, a transistor having base, emitter, and collector electrodes, input circuit means connected for applying an input signal between said base and emitter electrodes, output circuit means connected for deriving an output signal between said collector and emitter electrodes, degenerative resistance means connected between said emitter electrode and a common point in said circuit, and a passive temperature sensitive impedance element having a negative temperature coefficient of resistance direct-current conductively and directly connected between said base electrode and an intermediate point of said resistance means, said intermediate point being selected so that the ratio of the resistance between said intermediate point and said emitter electrode to the resistance between said intermediate point and said common point provides with said impedance element a substantially constant output current for said transistor.

5. In an amplifier circuit, the combination with a transistor having base, emitter, and collector electrodes, an input circuit including a pair of terminals one of which is connected with said base electrode and the other of which is connected to circuit ground, and an output circuit including a pair of terminals one of which is connected with said collector electrode and the other of which is connected to circuit ground, of a passive negative temperature coefficient resistance element direct-current conductively and directly connected between said base electrode and a point in said circuit, a first resistor connected between said emitter electrode and said point, and a second resistor connected between said point and circuit ground, the ratio of the resistance of said first resistor to the resistance of said second resistor being selected relative to the temperature characteristics of said thermistor to compensate for variations in the collector output current of said transistor with changes in temperature.

6. A stabilized amplifier circuit comprising, in combination, a transistor having base, emitter, and collector electrodes, a signal input circuit for said amplifier connected with said base electrode, a signal output circuit for said amplifier connected with said collector electrode, means providing a predetermined impedance between said emitter electrode and a point of reference potential in said amplifier circuit, and a passive temperature sensitive impedance element having a negative temperature coefficient direct-current conductively and directly connected between said base electrode and an intermediate point of said last named means, said intermediate point being selected relative to the characteristics of said element to stabilize the circuit operation of said transistor with variation in temperature.

References Cited in the file of this patent

UNITED STATES PATENTS

| | | |
|---|---|---|
| 2,751,550 | Chase | June 19, 1956 |
| 2,759,052 | Macdonald et al. | Aug. 14, 1956 |
| 2,761,916 | Barton | Sept. 4, 1956 |
| 2,761,917 | Aronson | Sept. 4, 1956 |
| 2,764,643 | Sulzer | Sept. 25, 1956 |

OTHER REFERENCES

Shea text, "Principles of Transistor Circuits," 1953, pages 175–179. Copy in Class. Division II.